(12) United States Patent
Stuber et al.

(10) Patent No.: US 6,934,782 B2
(45) Date of Patent: Aug. 23, 2005

(54) PROCESS AND APPARATUS FOR MANAGING USE OF A PERIPHERAL BUS AMONG A PLURALITY OF CONTROLLERS

(75) Inventors: Russell B. Stuber, Boulder, CO (US); Christopher M. Giles, Lafayette, CO (US); David O. Sluiter, Superior, CO (US)

(73) Assignee: LSI Logic Corporation, Milpitas, CA (US)

(*) Notice: Subject to any disclaimer, the term of this patent is extended or adjusted under 35 U.S.C. 154(b) by 339 days.

(21) Appl. No.: 10/328,462

(22) Filed: Dec. 23, 2002

(65) Prior Publication Data

US 2004/0123006 A1 Jun. 24, 2004

(51) Int. Cl.[7] .......................... G06F 13/14; G06F 13/38
(52) U.S. Cl. ........................ 710/240; 709/208
(58) Field of Search .................. 710/107–109, 710/200, 220, 240–244, 117, 110; 370/462; 340/825.5, 825.51; 709/208

(56) References Cited

U.S. PATENT DOCUMENTS

| | | | | |
|---|---|---|---|---|
| 4,734,909 A | * | 3/1988 | Bennett et al. | 370/462 |
| 5,131,085 A | * | 7/1992 | Eikill et al. | 710/110 |
| 5,572,686 A | * | 11/1996 | Nunziata et al. | 710/116 |
| 5,682,467 A | * | 10/1997 | Ambalavanar | 358/1.15 |
| 6,112,273 A | * | 8/2000 | Kau et al. | 710/260 |
| 6,141,715 A | * | 10/2000 | Porterfield | 710/113 |
| 6,496,890 B1 | * | 12/2002 | Azevedo et al. | 710/110 |

OTHER PUBLICATIONS

"Wrapper–based bus implementation techniques for performance improvement and cost reduction" by Anjo, K; Okamura, A; Motomura, M. (abstract only) Publication Date: May 2004.*

"Synchronous interlocked pipelines" H. M. Jacobson et al. (abstract only) Publication Date: Apr. 8–11, 2002.*

* cited by examiner

*Primary Examiner*—Gopal C. Ray
(74) *Attorney, Agent, or Firm*—Westman, Champlin & Kelly, P.A.

(57) ABSTRACT

Ownership of a peripheral bus between a peripheral device and a plurality of master devices is assigned to one of the master devices. Each master device has an associated controller for controlling the peripheral device via the peripheral bus. Communication occurs without impediment between the master device and its controller that have ownership of the bus, thereby conducting transactions via the peripheral bus and peripheral device. Communication with the master device and controller not having ownership is blocked, making the controller look busy to the master device and making the master device look idle to the controller. The ownership is assigned to the master/controller pairs using an arbiter arrangement.

20 Claims, 2 Drawing Sheets

PROCESS AND APPARATUS FOR MANAGING USE OF A PERIPHERAL BUS AMONG A PLURALITY OF CONTROLLERS

CROSS-REFERENCE TO RELATED APPLICATIONS

This application is related to application Ser. No. 10/328,618, for "Four-Phase Handshake Arbitration" filed on even date herewith by R. Stuber, D. Sluiter and C. Giles.

FIELD OF THE INVENTION

This invention relates to data communications, and particularly to managing communications between plural master devices and at least one peripheral device.

BACKGROUND OF THE INVENTION

Data buses are used in integrated circuits (ICs) to transfer data between termination devices within the IC. Usually, one or more of the termination devices is, or is coupled to, a user-controlled device such as a microprocessor and operates as a control device. Another termination device is, or is coupled to, a peripheral device, such as an on-chip or off-chip memory or the like, and operates as a controlled device. For example, an IC might include a microprocessor coupled through a main bus to a bus slave that operates or controls a peripheral controller and/or peripheral device. If the peripheral device is an off-chip device, such as an off-chip memory, the peripheral controller may be on the same chip as the bus slave, and a peripheral bus provides control and data communications between the off-chip peripheral device and the on-chip peripheral controller.

Ordinarily, a single peripheral device is controlled by a single controller through a peripheral bus. Consequently, the peripheral controller is often included on the same IC chip as the bus slave. If it is desired to add a second termination device to control the peripheral device, it may be accomplished by adding another IC chip containing the second termination device (bus slave, for example) and a second peripheral controller. Under such circumstances, the second peripheral controller would also coupled to the peripheral bus. Thus, an off-chip memory would be coupled by a peripheral bus to several peripheral controllers on different IC chips, each peripheral controller being coupled to a different master device, such as through a respective bus slave and main bus. To avoid conflict between the plural peripheral controllers' operation of the peripheral device, it is necessary to arbitrate use of the peripheral bus among the several peripheral controllers, allowing one or another peripheral controller access to the peripheral bus.

It might be possible to accommodate plural master devices through a modification of a single peripheral controller. However, modification of the peripheral controller increases the risk of timing conflicts. Moreover, if the peripheral controller is of a standard, verified design, modification of a peripheral controller requires re-verification, a time-consuming process.

There is a need for an system that permits communication between plural master devices and a peripheral device without modification of the peripheral controller and for a system that arbitrates use of the peripheral device among the plural peripheral controllers.

SUMMARY OF THE INVENTION

The present invention is directed to a data communication system between a peripheral device and plural master devices. Ownership of the peripheral bus is assigned to one of the master devices and communication occurs without impediment between that master device and its controller to use the peripheral bus and peripheral device. Communication with the master device not having ownership is blocked by making its controller look busy and by making that master device look idle to the controller.

A first or second ownership signal is selectively asserted so that a respective first or second master device may conduct transactions with the peripheral device. A first controller is coupled to the first master device in response to the first ownership signal so that the first controller may receive commands from the first master device and the first master device may receive signals from the first controller. The second controller is coupled to the second master device in response to de-assertion of the second ownership signal so that the second master device appears idle to the second controller and the second controller appears busy to the second master device.

In an optional embodiment, use of the peripheral bus is arbitrated between the several master/controller pairs to assign bus ownership to one pair. First and second arbiters supply the respective first and second ownership signals to the respective first and second master devices and controllers. The second arbiter is operated to assert a request signal when the second master device is ready to conduct a data transfer transaction with the peripheral device. The first arbiter is responsive to the asserted request signal to assert a first acknowledge signal, and to de-assert the acknowledge signal when the first arbiter no longer "owns" the bus. The second arbiter is responsive to the de-asserted first acknowledge signal to assert the second ownership signal. The second arbiter is responsive to completion of a data transfer transaction by the second master device to de-assert the ready and second ownership signals.

DETAILED DESCRIPTION OF THE PREFERRED EMBODIMENTS

As used herein, a "master device" is apparatus that controls a "slave device" to perform transactions between the master device and a peripheral device coupled to the slave device. As used herein, a "master device" may include a bus slave that itself receives control signals from one or more microprocessors via a main bus to control operation of a peripheral device. In such a case, the "master device" includes the microprocessor(s), main bus and bus slave of the main bus system. As used herein, a "slave device" includes a controller, such as a memory controller, coupled to a master device (i.e., a bus slave), and is operable to control the peripheral device, such as an on-chip or off-chip memory. Plural master devices may be coupled to respective slave devices to operate a common peripheral device. Thus, any master device may conduct a transaction though its respective peripheral controller with the peripheral device.

Figure 1:
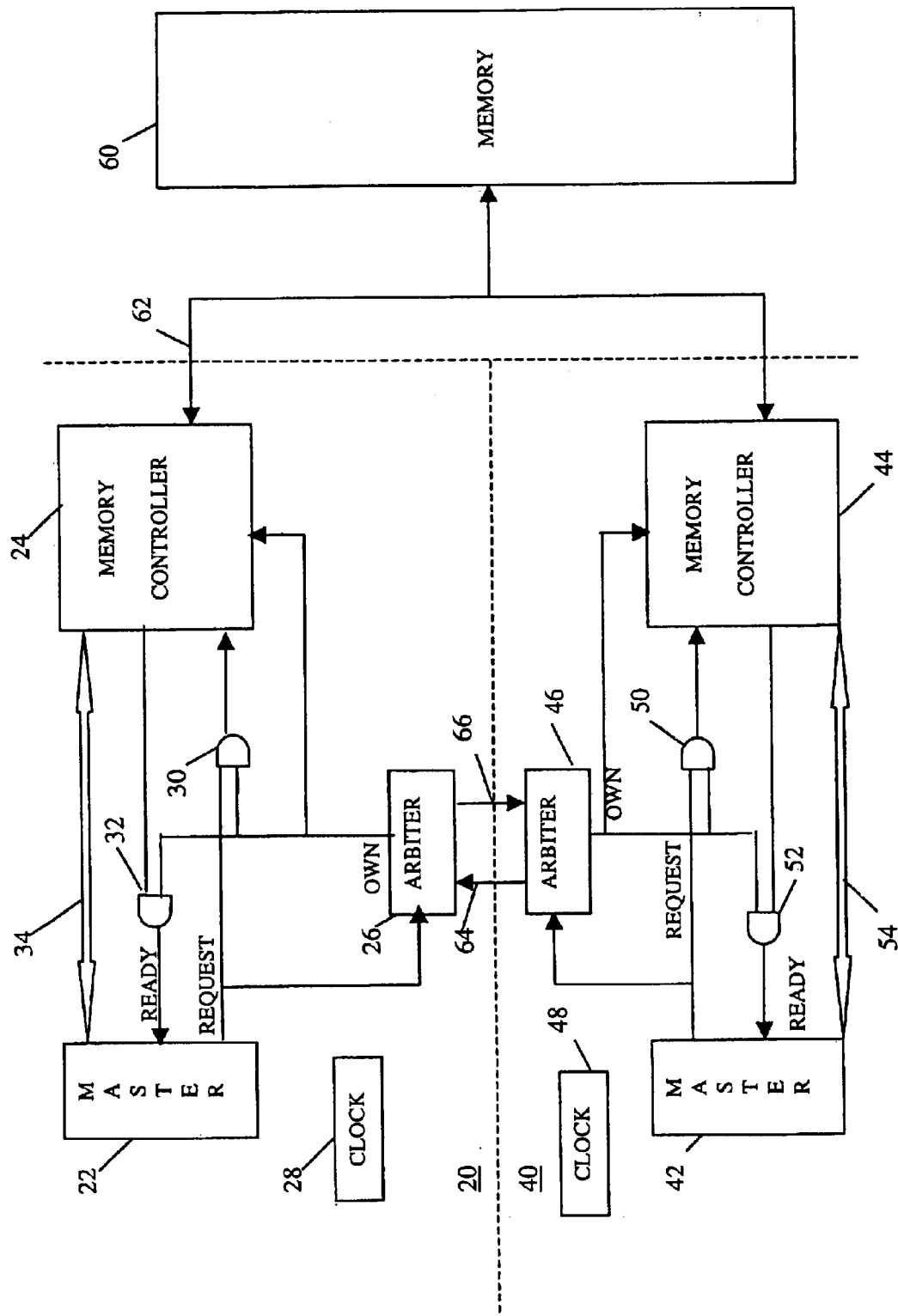
FIG. 1 is a block diagram of a communication control system in accordance with an embodiment of the present invention.

FIG. 1 illustrates a communication system in accordance with an embodiment of the present invention. A first integrated circuit chip 20 includes master device 22, memory controller 24 and arbiter 26 all operating at a clock frequency established by clock 28. Master device 22 provides request signals through gate 30 to memory controller 24 and receives ready signals from memory controller 24 through gate 32. Arbiter 26 provides an ownership signal to gates 30 and 32 and memory controller 24. Master device 22 also provides request signals to arbiter 26.

Similarly, a second IC chip 40 includes master device 42, memory controller 44 and arbiter 46 all operating under control of clock 48. Master device 42 provides request signals to arbiter 46 and through gate 50 to memory controller 44, and master device 42 receives ready signals from memory controller 44 through gate 52. Arbiter 46 receives request signals from master device 42 and provides ownership signals to gates 50 and 52, and memory controller 44.

Data are transferred between master device 22 and memory controller 24 via data bus 34, and data are transferred between master device 42 and memory controller 44 via data bus 54. Memory controllers 24 and 44 are coupled to memory 60 via peripheral bus 62. Each memory controller 24 and 44 tri-states to operate in active states with high and low signals (ones and zeros) on bus 62, or in an idle state to appear as a high-impedance device to bus 62. In the active state, the memory controller can transfer data (send and receive) between its master device and memory 60 via peripheral bus 62; in the idle (high-impedance) state, the memory controller will not adversely affect a transaction between memory 60 and a different controller.

One of the arbiters, such as arbiter 46, is designated a slave arbiter, and asserts request signals via line 64 to the other arbiter, namely arbiter 26, which is designated a master arbiter. The master arbiter 26 asserts acknowledge signals to slave arbiter 46 via line 66. The designation of one or the other of the arbiters as master or slave is arbitrary, although whether an arbiter is a master or slave arbiter affects the protocol of the master/controller pair's access to peripheral bus 62.

Clocks 28 and 48 provide cyclic clock signals to the elements on their respective ICs 20 and 40. The clock frequencies supplied by clocks 28 and 48 are preferably, but not necessarily, the same. Therefore, the devices on IC 20 may operate at a different clock frequency from the devices on IC 40. Moreover, memory 60 might operate at a different clock frequency from either clock 28 or 48, so memory controllers 24 and 44 may transfer data with memory 60 at the clock frequency of the memory and transfer data with their respective master devices 22 or 42 at the clock frequency of the respective clock 28 or 48.

In the operation of the apparatus illustrated in FIG. 1, one or the other of arbiters 26 and 46 asserts an ownership signal to the respective gates on that chip. The master device and memory controller on that chip operate in a normal manner. Thus, if arbiter 26 asserts an ownership signal to gates 30 and 32, a request signal from master 22 passes through gate 30 to operate memory controller 24 for use of peripheral bus 62 to conduct a transaction with memory 60. Similarly, a ready signal indicating that memory controller 24 is in a ready state passes through gate 32 to master device 22. Moreover, the asserted ownership signal operates memory controller 24 to an active state to conduct the transaction with memory 60 and thereby send and receive data via peripheral bus 62. Hence, master device 22 and memory controller 24 have "ownership" of peripheral bus 62 to memory 60.

Only one arbiter can assert ownership at any given time. Therefore, if arbiter 26 is asserting ownership to IC 20, arbiter 46 will not assert ownership to IC 40. Consequently, gates 50 and 52 are not enabled, and request signals from master device 42 are blocked by gate 50 from memory controller 44 and ready signals from memory controller 44 are blocked from master device 42. Consequently, master device 42 appears to be idle (making no requests) to memory controller 44, and memory controller 44 appears to be busy to master device 42. Moreover, memory controller 44 is responsive to the de-asserted ownership signal from arbiter 46 to operate to a high-impedance state so that it does not interfere with another controller's transactions with memory 60 via peripheral bus 62. Thus, the de-asserted ownership signal to gate 50 blocks master device 42 from use of peripheral bus 62, and the de-asserted ownership signal to gate 52 makes peripheral bus 62 appear busy to master device 42. Consequently, master device 42 will not transmit to memory controller 44 and the memory controller 44 will not look to master device 42 for data or control.

Arbiters 26 and 46 operate to assign ownership of peripheral bus 62 to one or the other of master/controller pairs. In the example, arbiter 26 is a "master" arbiter and, if arbiter 46 does not currently "own" the bus, will respond to a request from master device 22 to assert an ownership signal to gates 30 and 32 and peripheral device 24, assigning ownership of peripheral bus 62 to master device 22 and memory controller 24. Consequently, arbiter 26 normally provides ownership signals gates 30 and 32. Arbiter 46 is a "slave" arbiter and will assert ownership signals to gates 50 and 52 and memory controller 44 if arbiter 26 does not "own" the bus.

In the event that master device 42 desires to gain access to peripheral bus 62 through memory controller 44, a request signal asserted by master device 42 is applied to arbiter 46 and gate 50. As previously described, gate 50 is not enabled, so the request signal is blocked from reaching memory controller 44. Arbiter 46 is responsive to the asserted request signal from master device 42 to assert a request to arbiter 26. If master device 22 has not asserted a request to arbiter 26, the ownership signal is de-asserted by arbiter 26 to gates 30 and 32 and memory controller 24. Arbiter 26 responds to the request signal to assert an acknowledge signal to arbiter 46. If arbiter 26 does not "own" bus 62, the acknowledge signal is de-asserted to operate arbiter 46 to assert an ownership signal to gates 40 and 52 and memory controller 44. Consequently, chip 40 is accorded ownership of peripheral bus 62 to the exclusion of chip 20.

If master device 22 had already asserted a request to arbiter 26 when master device 42 asserts its request to arbiter 46 (e.g., master device 22 is conducting a transaction with memory 60), arbiter 26 will not de-assert ownership to gates 30 and 32, nor de-assert the acknowledgement to arbiter 46, so chip 40 is denied ownership of bus 62. Consequently, arbiter 46 continues to de-assert ownership to chip 40.

Figure 2:
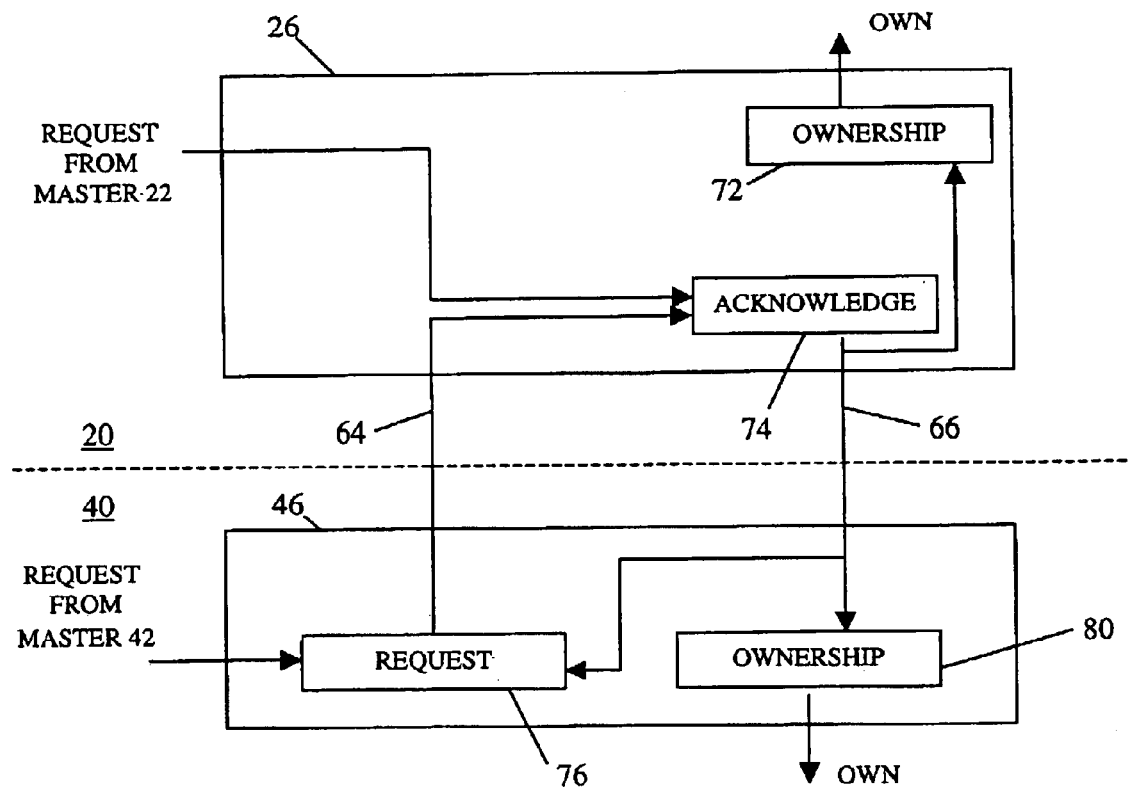
FIG. 2 is a function diagram of master and slave arbiters for the system illustrated in FIG. 1.
Figure 3:
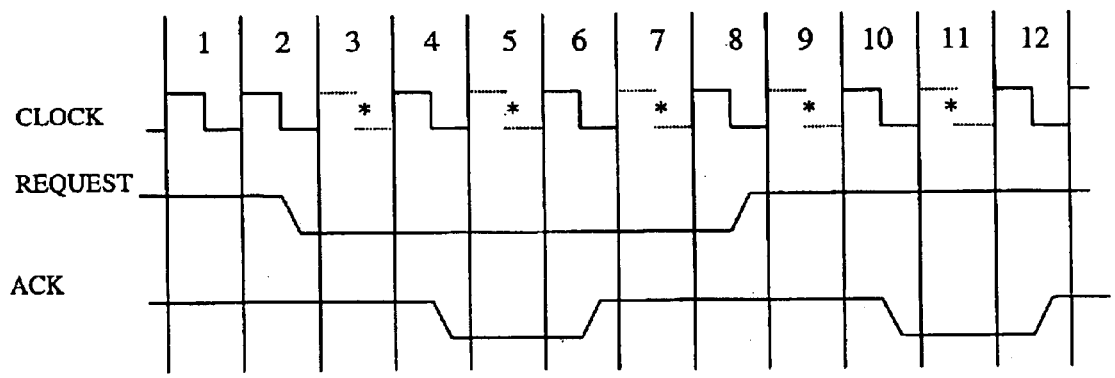
FIG. 3 is a timing diagram illustrating the arbitration protocol between the master and slave arbiters illustrated in FIG. 2.

FIG. 2 is a detailed functional diagram of arbiters 26 and 46 and FIG. 3 is a timing diagram illustrating a preferred four-phase handshake between master arbiter 26 and slave arbiter 46 in accordance with an embodiment of the present invention. As shown in FIG. 2, if master arbiter 26 awards ownership of peripheral bus 62 to the pair comprising master device 22 and controller 24, a request from master device 22 operates acknowledge device 74 so that it does not de-assert any acknowledge signal for arbiter 46. This assures that the ownership signal from device 72 will remain asserted for the duration of any transaction between master device 22 and memory 60. The physical form of arbiters 26 and 46 is not material to the present invention, and arbiters 26 and 46 may take on any of several physical forms, including states of signals in the chips, hardware such as flip-flops and registers and the like, and combinations of both.

In FIG. 3, all signals are normally high when de-asserted and are low when asserted. Clock signals are shown in FIG. 3 and are assumed to be phase and frequency synchronous for clocks 28 and 48 (FIG. 1). The clocks may be different, in which case adjustment for clock differences may be necessary.

Clock cycle 1 illustrates the condition of arbiters 26 and 46 prior to a request from master device 42. A request signal from master device 42 to request device 76 is high (de-asserted). Consequently, the request on line 64 is high (de-asserted) and the acknowledge signal from device 74 on line 66 is also high (de-asserted). If master device 42 desires to access peripheral bus 62, it issues a request signal to device 76 to assert a request via line 64 to device 78, shown in FIG. 3 at clock cycle 2. The request signal from device 76 is asserted until the transaction to be performed by master device 42 is completed. Request cycles 3 in FIG. 3 represents the period for arbiter 26 to receive the asserted request signal and an acknowledge signal is asserted (clock cycle 4).

If master device 22 is conducting a transaction with memory 60 the acknowledge signal is asserted for a period of time (cycles 5) until the transaction between master device 22 and peripheral device 60 is completed. At that time, the request signal from master device is de-asserted to acknowledge device 74 to de-assert the acknowledge signal (clock cycle 6).

De-assertion of the acknowledge signal operates ownership device 72 to de-assert the ownership signal to chip 20 (gates 30 and 32 and controller 24) and to operate ownership device 80 to assert an ownership signal to chip 40 (gates 50 and 52 and controller 44). Hence, at clock cycle 6 control of peripheral bus 62 is handed over from chip 20 to chip 40.

As shown at transaction cycles 7, master device 42 conducts its transaction with peripheral device 60 via bus 62 as heretofore described, continuing to assert its request signal to device 76 to maintain the acknowledge signal on line 66 de-asserted. Upon completion of the transaction, master device 42 de-asserts its request signal, thereby operating device 76 to de-assert its request signal to acknowledge device 74 (clock cycle 8). Cycles 9 represent the time required for arbiter 26 to operate device 74 to re-assert the acknowledge signal on line 66 (clock cycle 10). As a result, ownership device 80 is operated during reset cycles 11 to de-assert ownership signals to chip 40, thereby giving up ownership of peripheral bus 62. Cycles 11 are long enough to permit receipt and operation by device 80. Thereupon, at clock cycle 12, device 74 de-asserts the acknowledge signal, thereby operating ownership device 72 to assert its ownership signal to chip 20. The protocol ends at clock cycle 12, with the de-assertion of acknowledge signal from device 74. In the preferred form of the arbitration scheme, ownership device 72 remains in a de-asserted ownership state, and responds to a request signal from master device 22 to re-assert ownership. Alternatively, device 72 could be operated to assert ownership to chip 20 upon de-assertion of the second acknowledge signal.

Upon completion of the protocol, master device 22 on master chip 20 can perform transactions with memory 60 in the normal manner.

One feature of the invention is that the number of request cycles 3 represents a timeout value, representing a maximum time necessary to receive an asserted acknowledge signal from master arbiter 26. If that timeout period expires before receiving the de-asserted acknowledge signal, slave arbiter 46 can presume that the master chip is malfunctioned ("dead"), whereupon slave arbiter 46 device 80 operates to assert an ownership signal to chip 40 and assume ownership of the peripheral bus. Another feature is that if master arbiter 26 fails to acknowledge receipt of the de-asserted request signal within a delay period established by cycles 9, the ownership asserted by arbiter 46 is de-asserted, placing memory controller 44 to an idle (high-impedance) state and slave arbiter may serve as a master arbiter.

The preferred arbitration scheme described herein is an efficient system and is easily expanded to accommodate any reasonable number of slave chips. Consequently, the number of master/controller pairs is not limited to two. The arbitration protocol of the present invention does not require an external arbiter, nor the use of additional communication bits to identify the functionality of the chips. While the arbitration scheme of FIGS. 2 and 3 is preferred, other arbitration protocols may be employed with the system of FIG. 1, such as an assigned priority scheme or handing off master control to whichever chip had most recent ownership. Also, while the arbitration technique of FIG. 2 advances the slave chip to its next state if the request signal times out without receipt of an acknowledge signal (clock cycles 3), instead arbiter 46 could be configured to assume the duties of the master arbiter, thereby reducing latency of future transactions by master device 42.

The ownership technique of FIG. 1 (regardless of what arbitration technique is employed) does not require modification of the controller, nor introduce timing conflicts. Instead, each master/controller pair operate in a normal manner, with the "owning" pair conducting transactions as if it were the only master/controller pair coupled to the peripheral bus, and the "non-owning" pair(s) being idled by making it appear to the controller that the master device is not using the peripheral device and making it appear to the master device that the controller is busy.

Although the present invention has been described with reference to preferred embodiments, workers skilled in the art will recognize that changes may be made in form and detail without departing from the spirit and scope of the invention.

What is claimed is:

1. A process for transacting data transfer on a data bus between a controlled device and a selected one of first and second controllers, wherein the first controller is operated by a first master device and the second controller is operated by a second master device, the process comprising steps of:

a) selectively asserting either a first or second ownership signal to select the respective first or second master device to conduct transactions with the controlled device;

b) coupling the first controller to the first master device in response to the first ownership signal so that the first controller conducts transactions between the first master device and the controlled device; and c) coupling the second controller to the second master device in response to the first ownership signal so that the second master device appears idle to the second controller and the second controller appears busy to the second master device.

2. The process of claim 1, wherein step a) is performed by asserting the first ownership signal while de-asserting the second ownership signal and by asserting the second ownership signal while de-asserting the first ownership signal, and wherein step b) is performed in response to the asserted first ownership signal and step c) is performed in response to the de-asserted second ownership signal.

3. The process of claim 2, further including steps of:
   d) de-asserting the first ownership signal and asserting the second ownership signal in response to a request from the second master device, and
   e) coupling the second controller to the second master device in response to the asserted second ownership signal so that the second controller conducts transactions between the second master device and the controlled device; and
   f) coupling the first controller to the first master device in response to the de-asserted first ownership signal so that the first master device appears idle to the first controller and the first controller appears busy to the first master device.

4. The process of claim 1, wherein the first master device and first controller are on a first integrated circuit and the second master device and second controller are on a second integrated circuit, and wherein each of the first and second integrated circuits has a respective first or second arbiter supplying the respective first and second ownership signals, the process further including steps of:
   d) operating the second arbiter to assert a request signal in response to a condition that the second master device is ready to conduct a data transfer transaction with the controlled device,
   e) operating the first arbiter in response to the asserted request signal to assert a first acknowledge signal and de-assert the first ownership signal,
   f) operating the second arbiter in response to the first acknowledge signal to assert the second ownership signal, and
   g) operating the second arbiter in response to completion of a data transfer transaction between the second master device and the controlled device to de-assert the ready and second ownership signals.

5. The process of claim 4, wherein the request signal is asserted for a first period of time representing a timeout period of the first master device, and step f) includes
   f1) operating the second arbiter in response to de-assertion of the first acknowledge signal to assert the second ownership signal.

6. The process of claim 5, wherein if step e) is not performed during the first period of time, the process further including:
   h) operating the second arbiter to assert the second ownership signal in response to absence of the first acknowledge signal during the first period of time.

7. The process of claim 5, wherein the first acknowledge signal is asserted for a second predetermined time period representing a transaction period of the first master device and a response delay of the second arbiter.

8. The process of claim 7, wherein the first and second integrated circuits include respective clocks, each providing cyclic clock signals to the respective master device, controller and arbiter, and wherein the respective first and second time periods are identified by respective clock cycles.

9. The process of claim 4, further including steps of:
   h) operating the first arbiter in response to de-assertion of the request signal to assert a second acknowledge signal; and
   i) operating the second controller to an idle state in response to absence of the second acknowledge signal for a third predetermined time period.

10. The process of claim 4, wherein the request signal is asserted for a first period of time representing a timeout period of the first master device, the process further including:
   h) operating the second arbiter to assert the second ownership signal in response to de-assertion of the first acknowledge signal during the first period of time.

11. Apparatus for controlling transactions on a data bus between a controlled device and first and second controllers coupled to respective first and second master devices, the apparatus comprising:
   arbiter apparatus for selectively asserting and de-asserting first and second ownership signals;
   a first enabling device responsive to an asserted first ownership signal to enable the first controller to conduct transactions between the first master device and the controlled device, and responsive to a de-asserted first ownership signal to prevent conducting transactions between the first master device and the controlled device; and
   a second enabling device responsive to an asserted second ownership signal to enable the second controller to conduct transactions between the second master device and the controlled device, and responsive to a de-asserted second ownership signal to prevent conducting transactions between the second master device and the controlled device, wherein the first and second ownership signals are coordinated so that one of the first and second ownership signals is asserted while the other of the first and second ownership signals is de-asserted.

12. Apparatus of claim 11, wherein the first enabling device comprises:
   a first gate responsive to the asserted first ownership signal for passing asserted requests from the first master device to the first controller, and
   a second gate responsive to the asserted first ownership signal for passing asserted ready signals from the first controller to the first master device, and the second enabling device comprises:
   a third gate responsive to the asserted second ownership signal for passing asserted requests from the second master device to the second controller, and
   a fourth gate responsive to the asserted second ownership signal for passing asserted ready signals from the second controller to the second master device.

13. Apparatus of claim 11, further including an arbiter for selectively asserting one of the first and second ownership signals while de-asserting the other of the second and first ownership signals.

14. Apparatus of claim 11, further including:
   a first integrated circuit including the first master device and first controller and a first arbiter, the first arbiter supplying the first ownership signals,
   a second integrated circuit including the second master device and second controller and a second arbiter, the second arbiter supplying the second ownership signals, the first and second arbiters being operable so that one of the first and second arbiters asserts the respective ownership signals while the other of the second and first arbiters de-asserts the other of ownership signals.

15. Apparatus of claim 14, wherein the second arbiter comprises:
   a request device responsive to a request from the second master device to assert a request signal, the request device being further responsive to completion of a data transfer transaction between the second master device and the controlled device to de-assert the request and second ownership signals, and an ownership device responsive to a first acknowledge signal to assert the second ownership signal, and the first arbiter comprises:

an acknowledge device responsive to the request signal to assert the first acknowledge signal.

16. Apparatus of claim 15, wherein the acknowledge device asserts first acknowledge signal for a time period representing a response delay of the second arbiter and any time period that the first ownership signal is asserted, the ownership device being responsive to the de-assertion of the first acknowledge signal to assert the second ownership signal.

17. Apparatus of claim 16, wherein the ownership device is further responsive to the absence of assertion of the first acknowledge signal during the first period of time to assert the second ownership signal.

18. Apparatus of claim 16, wherein the first and second integrated circuits include respective clocks, each providing cyclic clock signals to the respective master device, controller and arbiter, and wherein the respective first and second time periods are identified by respective clock cycles.

19. Apparatus of claim 16, wherein the ownership device is responsive to the request device to assert the second ownership signal if assertion of the acknowledge signal is not received by the ownership device within a predetermined period of time representing a timeout period of the first arbiter.

20. Apparatus of claim 15, wherein the acknowledge device is further responsive to de-assertion of the request signal to assert a second acknowledge signal, and the ownership device is responsive to an absence of the second acknowledge signal for a third predetermined time period to idle the second controller.

* * * * *